(No Model.)
R. W. HENT.
ROLLER BEARING.
No. 579,269. Patented Mar. 23, 1897.
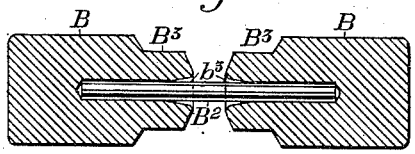
Fig. 1.
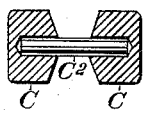
Fig. 2.
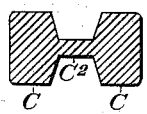
Fig. 3.
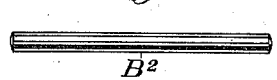
Fig. 4.
Fig. 5.
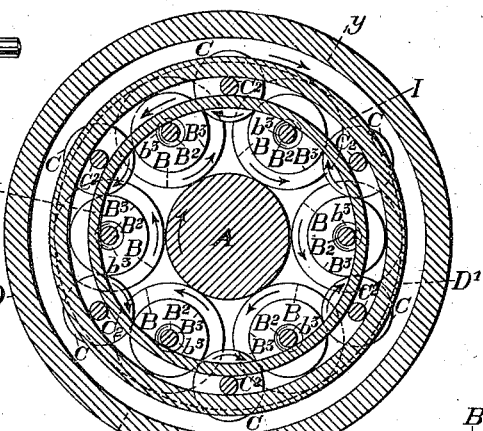
Fig. 10.
Fig. 6.
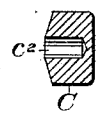
Fig. 7.
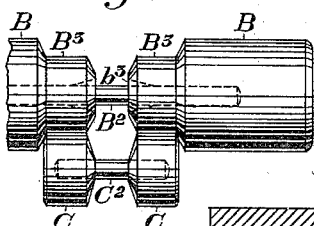
Fig. 8.
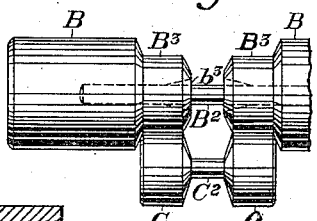
Fig. 9.
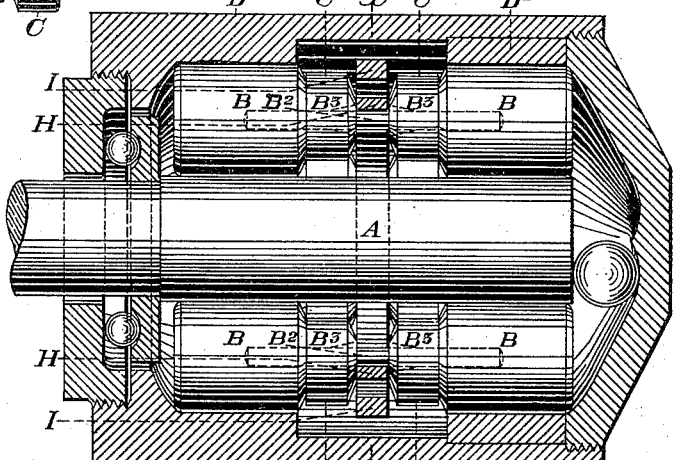
Fig. 11.
Witnesses:
William L. Shattuck.
Charles D. South
Inventor:
Reuben W. Hent

UNITED STATES PATENT OFFICE.

REUBEN W. HENT, OF SAN FRANCISCO, CALIFORNIA.

ROLLER-BEARING.

SPECIFICATION forming part of Letters Patent No. 579,269, dated March 23, 1897.

Application filed January 21, 1896. Serial No. 576,295. (No model.)

*To all whom it may concern:*

Be it known that I, REUBEN W. HENT, a citizen of the United States, residing in the city and county of San Francisco and State of California, have invented a certain new and useful Improvement in Roller-Bearings, of which the following is a specification.

My invention is an improvement on my roller-bearing patented September 24, 1889, No. 411,500. In said roller-bearing, the journals on which the separating-rollers bear being located at the outer ends of the bearing-rollers, the journals or rods which connect the two outer parts of the separating-rollers are so long that they are liable to spring, and the journals of the bearing-rollers which bear on the ring interposed between them and the journals of the separating-rollers being necessarily of small diameter, especially if the antifriction proportions are observed, and being integral with or rigidly affixed to the bearing-rollers will be cut or twisted off from the latter if the shaft wears at all unevenly or for any reason one part of a bearing-roller tends to rotate faster than its counterpart or the two bearing parts of the roller are not in exact alinement. The same is true to some, though not to the same, extent of said journals of the separating-rollers.

The object of my improvement is to remedy these defects and incidentally to facilitate the manufacture of the rollers. I attain said object by locating the first-mentioned journals next to the interposed ring, making the bearing-roller journals on which said ring bears revoluble within the bearing parts, and slightly enlarging the outer ends of the sockets in which the journals are revoluble, also by making the journals of the separating-rollers revoluble in the parts bearing on the bearing-rollers. In such location of the first-mentioned journals, in said revoluble journals, and in said enlargement of said sockets consists, essentially, my improvement.

It is illustrated in the accompanying drawings, embodying my improvement, in which—

Figure 1 is a longitudinal section through the center of a bearing-roller, the revoluble journal being shown in elevation. Fig. 2 is a longitudinal section through the center of a separating-roller, the revoluble journal being shown in elevation. Fig. 3 is a longitudinal section through the center of a solid separating-roller. Fig. 4 represents the revoluble journal of a bearing-roller, removed therefrom; Fig. 5, the revoluble journal of a separating-roller, removed therefrom. Fig. 6 is a longitudinal section through the center of one of the bearing parts of a bearing-roller, the revoluble journal being removed. Fig. 7 is a longitudinal section through the center of one of the parts of a separating-roller bearing on the bearing-rollers, the revoluble journal being removed. Fig. 8 is a side view of a bearing-roller and a separating-roller, showing the relative positions of the rollers as seen along the plane tangent to both. Fig. 9 is a side view of a bearing-roller and a solid separating-roller, showing the relative positions of the rollers as seen along the plane tangent to both. Fig. 10 is a transverse section through the center of a roller-bearing or on the line $x\ x$, Fig. 11; and Fig. 11 is a longitudinal section through the center of a roller-bearing or on the line $y\ y$, Fig. 10, the shaft and rollers being shown in elevation.

A represents the shaft; B, the parts of the bearing-rollers bearing on the shaft A and the bearing-casing; $B^2$, the journals revoluble in two opposite parts B B; $b^2$, the sockets within the parts B; $B^3$, the journals on which the separating-rollers bear; $b^3$, the enlarged ends of the sockets $b^2$ in the parts B; C, the parts of the separating-rollers bearing on the journals $B^3$; $C^2$, the journals revoluble in two opposite parts C C, or, Fig. 3, the short journals integral with or rigidly affixed to the parts C C; $c^2$, the sockets in the parts C; D, the casing; D', a sleeve within the casing D; H, the ring coaxial with the shaft and bearing at its periphery on the journals $C^2$ and at its inner side on the journals $B^2$, and I the ring also coaxial with the shaft and bearing at its inner side on the journals $C^2$.

Each bearing-roller consists of two bearing parts B B and of a journal $B^2$ between and revoluble within said parts. The portions of the parts B B which are located next to their outer ends bear directly on the shaft A and the bearing-casing. The journals $B^3$ $B^3$ are located on the parts B B, next to their inner ends or to the ring H, and form bearings for the parts C C of the separating-rollers. These journals B³ may be equal to or larger or smaller, either in diameter or length, or in both, than the portions of the parts B B which bear on the shaft and casing. Preferably they are smaller both in diameter and length, as shown in the drawings. The location of these journals B³ next to the ring H, instead of (as in said patented roller-bearing) next to the outer ends of the parts B, greatly reduces the length of the separating-rollers and their journals, and thus lessens their liability to spring. Each part B is provided with a socket $b^2$, extending through the journal B³ to preferably a little beyond the longitudinal center of the part B, for the insertion of the journal B². This socket $b^2$ is preferably enlarged a short distance at its end next to the ring H, the enlargement $b^3$ being, preferably, conical or funnel-shaped, as shown in the drawings. The journal B², while fitting closely in the socket $b^2$, should be of such diameter as to be easily revoluble therein.

The journals B², being revoluble within the parts B B, permit said parts to rotate independently of each other, and one to rotate faster than the other, if there is any such tendency on account of any inequality in the diameters of the rollers or of the parts of the shaft or casing on which the rollers bear or on any other account, thus preventing any torsional strain of the journals B². The enlargement $b^3$ of the socket $b^2$ locates the point of greatest strain of the journal B² a short distance within the parts B, so that if it should break on account of the two parts B B of a roller not being in exact alinement, from inequality of wear of the shaft, or for any other reason the break will occur within the parts B B, and the broken journal B² still will be retained between the parts B B and perform its functions to a great extent.

Preferably each separating-roller is also formed of the two parts C C and of a journal C² revoluble therein. The parts C C bear on the journals B³ B³ to keep the rollers separate from each other and are provided with sockets $c^2$ $c^2$, extending nearly through the parts C C, for the insertion of the journal C². These journals C² also, while closely fitting in the sockets $c^2$, should be of such diameter as to be easily revoluble therein, thus permitting the independent rotation of the parts C C and thereby preventing all torsional strain of the journals C². But the journal C² may be made integral with or rigidly affixed to the parts C C.

If the antifrictional proportions are observed, as they preferably are, and all the parts of the bearings are exactly made, the revoluble journals B² and C² will not revolve in their respective rollers, but will rotate with them as though integral therewith, and it is only to the extent that a part B or a part C rotates faster than its counterpart that these journals will revolve therein, thus transferring much of any possible sliding friction from the peripheries of the rollers to points near their centers.

The casing D and the sleeve or bearing-ring D′ within the casing form the bearing-casing and leave a groove for the free operation of the separating-rollers and of the ring I. This groove should be a little longer than the separating-rollers, so that the latter will not touch its walls. The location of the entire separating-roller within the groove also has the advantage of permitting the journals C² to be placed any distance from the shaft without touching the bearing-casing.

Instead of one sleeve D′ two sleeves D′ may be inserted within a hollow cylinder and thus form the bearing-casing with the necessary groove.

I claim as my invention—

1. In a roller-bearing, the combination with the shaft and casing, of a series of bearing-rollers, revoluble journals therefor, a series of separating-rollers, journals therefor, and a ring bearing at its periphery on journals of the separating-rollers and at its inner side on the journals revoluble in the bearing-rollers, substantially as set forth.

2. In a roller-bearing the combination with the shaft and casing, of a series of bearing-rollers, revoluble journals therefor, a series of separating-rollers, revoluble journals therefor, and a ring bearing at its periphery on the journals revoluble in the separating-rollers and at its inner side on the journals revoluble in the bearing-rollers, substantially as set forth.

3. In a roller-bearing, the combination with the shaft and casing, of a series of bearing-rollers, a series of separating-rollers, a ring bearing at its periphery on journals of the separating-rollers and at its inner side on journals revoluble in the bearing-rollers, and a ring bearing at its inner side on said journals of the separating-rollers, substantially as set forth.

4. In a roller-bearing, the combination with the shaft and casing, of a series of bearing-rollers, a series of separating-rollers, a ring bearing at its periphery on journals revoluble in the separating-rollers and at its inner side on journals revoluble in the bearing-rollers, and a ring bearing at its inner side on said first-mentioned journals, substantially as set forth.

5. In a roller-bearing, the combination with the shaft and casing, of a series of bearing-rollers, each consisting of two bearing parts and of a journal revoluble therein, a series of separating-rollers bearing on said bearing parts, and a ring bearing at its periphery on journals of the separating-rollers, and at its inner side on the journals revoluble in the bearing-rollers, substantially as and for the purposes set forth.

6. In a roller-bearing, the combination with the shaft and casing, of a series of bearing-rollers, each consisting of two bearing parts and of a journal revoluble therein, a series of separating-rollers, each consisting of two parts bearing on said bearing parts and of a journal revoluble in said parts of the separating-rollers, and a ring bearing at its periphery on the journals revoluble in the separating-rollers and at its inner side on the journals revoluble in the bearing-rollers, substantially as and for the purposes set forth.

7. In a roller-bearing, the combination with the shaft and bearing-casing, of a series of bearing-rollers, each consisting of two parts bearing directly on both the shaft and casing and of a journal between and revoluble within said two parts, a series of separating-rollers, bearing on said two parts of the bearing-rollers, a ring bearing at its periphery on journals of the separating-rollers and at its inner side on the journals revoluble within said two parts of the bearing-rollers, and a ring bearing at its inner side on said journals of the separating-rollers, substantially as and for the purposes set forth.

8. In a roller-bearing, the combination with the shaft and bearing-casing, of a series of bearing-rollers, each consisting of two parts bearing directly on both the shaft and casing and of a journal between and revoluble within said two parts, a series of separating-rollers, each consisting of two parts bearing on said two parts of the bearing-rollers and of a journal between and revoluble in said two parts of the separating-rollers, a ring bearing at its periphery on the journals revoluble in said two parts of the separating-rollers and at its inner side on the journals revoluble within said two parts of the bearing-rollers, and a ring bearing at its inner side on the journals revoluble in said two parts of the separating-rollers, substantially as and for the purposes set forth.

9. In a roller-bearing, the combination with the shaft and bearing-casing, of a ring coaxial with the shaft, a series of bearing-rollers, each consisting of two bearing parts and of a journal between and revoluble within said two bearing parts and bearing on the inner side of said ring, the portions of said bearing parts next to their outer ends bearing directly on the shaft and casing and the portions next to said ring bearing neither on the shaft nor casing, a series of separating-rollers bearing only on said portions of the bearing-rollers next to said ring, and having journals bearing on the periphery of said ring, and a larger ring also coaxial with the shaft and bearing at its inner side on said journals of the separating-rollers, substantially as and for the purposes set forth.

10. In a roller-bearing, the combination with the shaft and bearing-casing, of a ring coaxial with the shaft, a series of bearing-rollers, each consisting of two bearing parts and of a journal between and revoluble within said two bearing parts and bearing on the inner side of said ring, the portions of said bearing parts next to their outer ends bearing directly on the shaft and casing and the portions next to said ring bearing neither on the shaft nor casing, a series of separating-rollers, each consisting of two parts bearing only on said portions of the bearing-rollers next to said ring and of a journal between and revoluble in said two parts of the separating-rollers and bearing on the periphery of said ring, and a larger ring also coaxial with the shaft and bearing at its inner side on the journals revoluble in said two parts of the separating-rollers, substantially as and for the purposes set forth.

11. In a roller-bearing, the combination with the shaft and bearing-casing, of a ring, H, coaxial with the shaft, a series of bearing-rollers, each consisting of two parts, B B, bearing directly on the shaft and casing and having journals, $B^3$ $B^3$, smaller in diameter than the parts, B B, and located next to the ring, and of a journal, $B^2$, between and revoluble within the parts, B B, and bearing on the inner side of the ring, a series of separating-rollers bearing only on the journals, $B^3$ $B^3$, and having journals, $C^2$, bearing on the periphery of the ring, and a ring, I, also coaxial with the shaft and bearing at its inner side on the journals, $C^2$, substantially as shown and described and for the purposes set forth.

12. In a roller-bearing, the combination with the shaft and bearing-casing, of a ring, H, coaxial with the shaft, a series of bearing-rollers each consisting of two parts, B B, having journals, $B^3$ $B^3$, and of a journal, $B^2$, revoluble in sockets, $b^2$ $b^2$, having enlarged ends, $b^3$ $b^3$, within the parts, B B, and bearing on the inner side of the ring, a series of separating-rollers bearing only on the journals, $B^3$ $B^3$, and having journals, $C^2$, bearing on the periphery of the ring, and a ring, I, bearing at its inner side on the journals, $C^2$, substantially as shown and described and for the purposes set forth.

13. In a roller-bearing, the combination with the shaft and bearing-casing, of a ring, H, coaxial with the shaft, a series of bearing-rollers, each consisting of two parts, B B, with journals, $B^3$ $B^3$, and having sockets, $b^2$ $b^2$, with enlarged ends, $b^3$ $b^3$, and of a journal, $B^2$, revoluble in the sockets, $b^2$ $b^2$, and bearing on the inner side of the ring, a series of separating-rollers, each consisting of two parts, C C, bearing only on the journals, $B^3$ $B^3$, and having sockets, $c^2$ $c^2$, and of a journal, $C^2$, revoluble in the sockets, $c^2$ $c^2$, and bearing on the periphery of the ring, and a ring, I, bearing at its inner side, on the journals, $C^2$, substantially as shown and described and for the purposes set forth.

14. A roller-bearing comprising the shaft, A, the casing, D, the sleeve, D', forming with the casing, D, the bearing-casing, a series of bearing-rollers, each consisting of two parts, B B, having journals, $B^3$ $B^3$, next to their inner ends, and sockets, $b^2$ $b^2$, with enlarged ends, $b^3$ $b^3$, and of a journal, $B^2$, revoluble in the sockets, $b^2$ $b^2$, a series of separating-rollers bearing on the journals, $B^3$ $B^3$, and having journals, $C^2$, a ring bearing at its periphery on the journals, $C^2$, and at its inner side on the journals, $B^2$, and a ring, I, bearing at its inner side on the journals, $C^2$, all constructed, arranged, combined, and adapted to operate substantially as shown and described and for the purposes set forth.

15. A roller-bearing comprising the casing, D, and the sleeve, $D^7$, forming the bearing-casing, and leaving a groove therein, the shaft, A, a series of bearing-rollers, each consisting of two parts, B B, provided with journals, $B^3$ $B^3$, and sockets, $b^2$ $b^2$, with enlarged ends, $b^3$ $b^3$, and of a journal, $B^2$, revoluble in the sockets, $b^2$ $b^2$, a series of separating-rollers, each consisting of two parts, C C, bearing only on the journals, $B^3$ $B^3$, and provided with sockets, $c^2$ $c^2$, and of a journal, $C^2$, revoluble in the sockets, $c^2$ $c^2$, a ring bearing at its periphery on the journals, $C^2$, and at its inner side on the journals, $B^2$, and a ring, I, bearing at its inner side on the journals, $C^2$, all constructed, arranged, combined, and adapted to operate substantially as shown and described and for the purposes set forth.

REUBEN W. HENT.

Witnesses:
WILLIAM L. SHATTUCK,
CHARLES D. SOUTH.